Sept. 13, 1932.   R. A. GLASER   1,877,657
PROJECTOR LAMP
Filed Jan. 23, 1929   6 Sheets-Sheet 1

Inventor
Rudolph A. Glaser.
By Emery, Booth, Janney & Varney
Attorneys.

Sept. 13, 1932. R. A. GLASER 1,877,657
PROJECTOR LAMP
Filed Jan. 23, 1929 6 Sheets-Sheet 2

Inventor
Rudolph A. Glaser.
By Emery, Booth, Janney & Varney
Attorneys.

Sept. 13, 1932.  R. A. GLASER  1,877,657
PROJECTOR LAMP
Filed Jan. 23, 1929  6 Sheets-Sheet 3
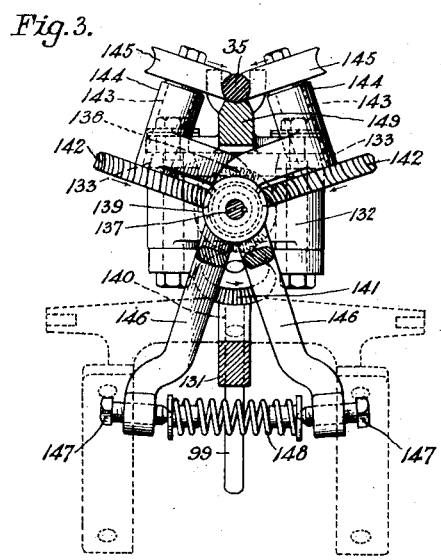
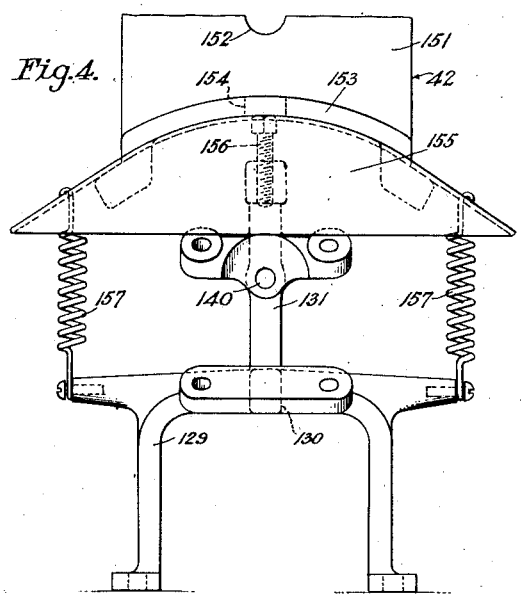
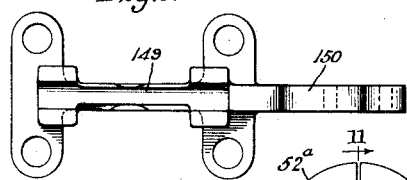
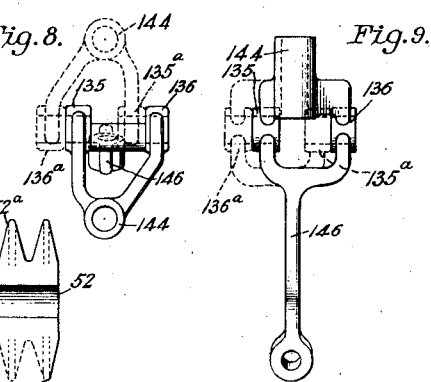
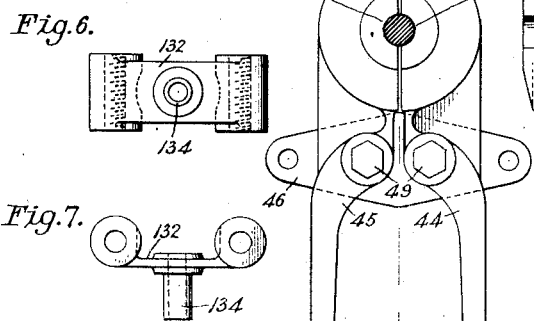
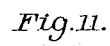
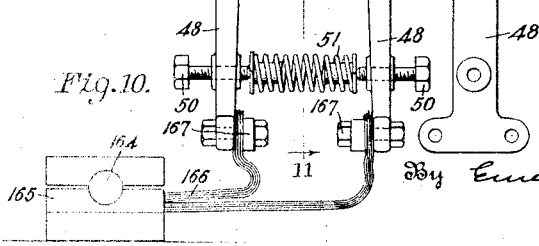
Inventor
Rudolph A. Glaser
By Emery, Booth, Janney & Varney
Attorneys.

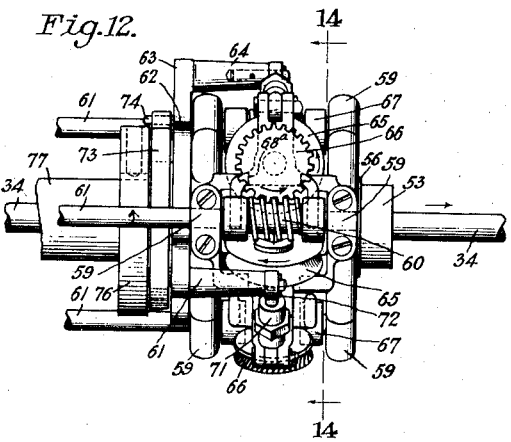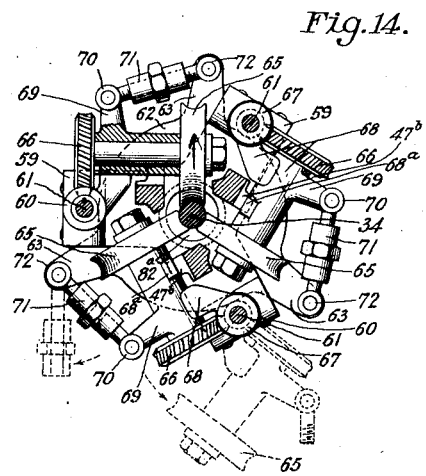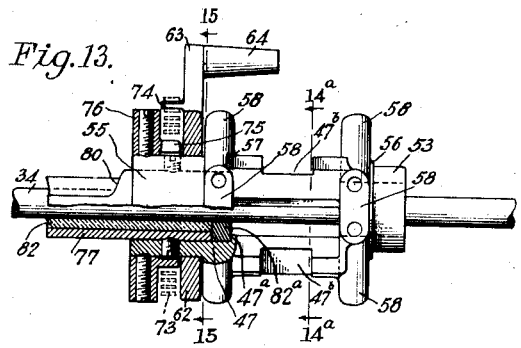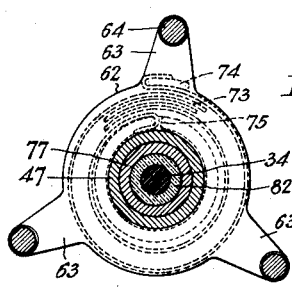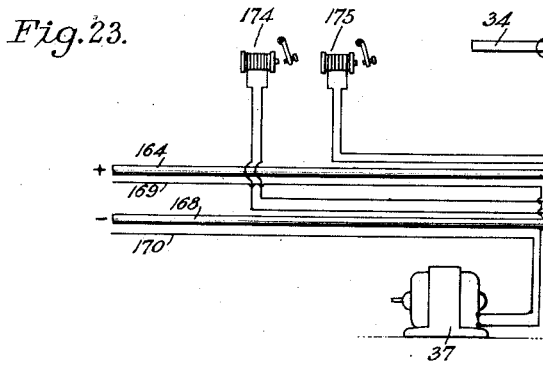

Sept. 13, 1932.   R. A. GLASER   1,877,657
PROJECTOR LAMP
Filed Jan. 23, 1929   6 Sheets-Sheet 5
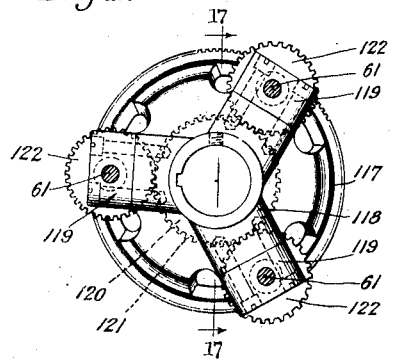
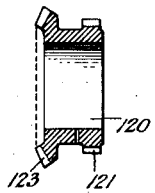
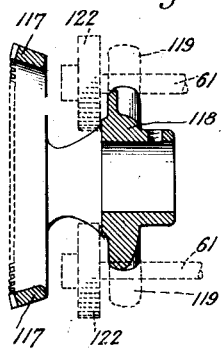
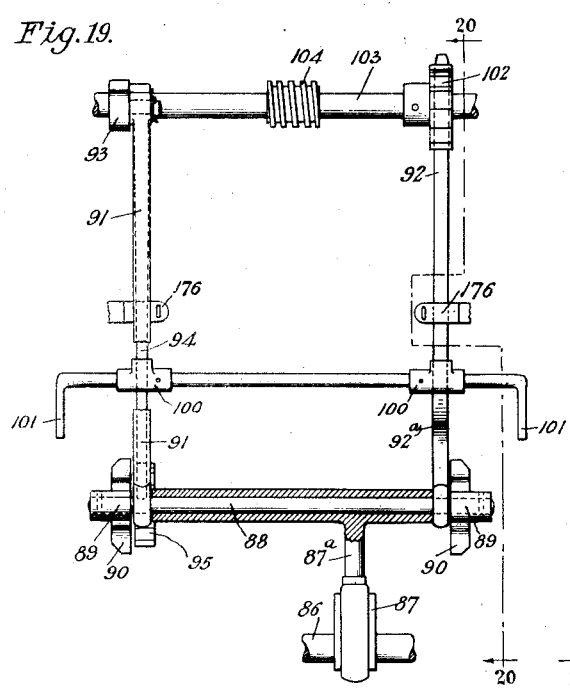
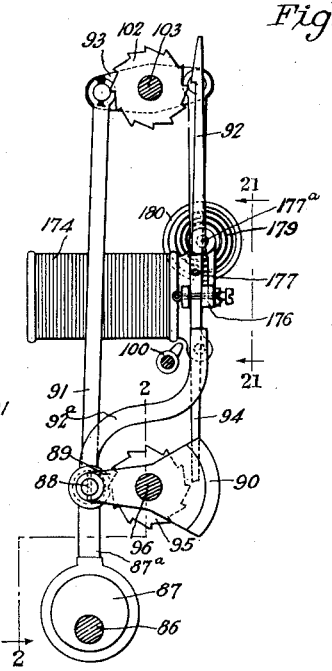
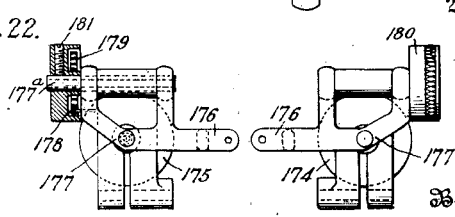
Inventor
Rudolph A. Glaser.
By Emery, Booth, Janney & Varney
Attorneys.

Sept. 13, 1932.  R. A. GLASER  1,877,657
PROJECTOR LAMP
Filed Jan. 23, 1929   6 Sheets-Sheet 6

Inventor
Rudolph A. Glaser.
By
Attorneys.

Patented Sept. 13, 1932

1,877,657

UNITED STATES PATENT OFFICE

RUDOLPH A. GLASER, OF CLEVELAND, OHIO, ASSIGNOR, BY MESNE ASSIGNMENTS, TO GARDNER ABBOTT, AS TRUSTEE

PROJECTOR LAMP

Application filed January 23, 1929. Serial No. 334,555.

This invention relates to a projector lamp particularly designed for use in photolithographic reproduction processes and characterized by a high capacity and efficiency in actinic light values and by precise regulation and smoothness of feed either automatically or by hand, together with absence of vibration.

The lamp is also characterized by the provision of special air cooling means and insulation for protecting the working parts from overheating and by an enclosure or casing for safeguarding the operator and affording convenient access to the electrodes, magnets and control mechanism. The casing is of pleasing appearance, in harmony with the spirit of organizations engaged in artistic work.

In order to minimize vibration the lamp mechanism is disposed symmetrically with reference to a central vertical longitudinal plane, so far as is possible consistent with mechanical necessities, and the parts are designed with a view to their rigidity and smooth, quiet functioning.

A further aim of my invention is to provide for locating the necessary feed mechanism close to the arc, so as to avoid long unsupported lengths of carbon, for positioning the arc with accuracy, and protecting the alinement from distortion or other damaging effects of heat.

A preferred embodiment of my invention is described below and shown in the accompanying drawings wherein like reference numerals refer to the same parts throughout and wherein;

Fig. 3 is a detailed view of the holding and feeding brackets and rollers for the negative electrode, taken on line 3—3 of Fig. 1, looking in the direction of the arrows;

Fig. 4 is a detailed view of the supporting bracket for the negative electrode, including the shield supporting means, shield, and drive shaft bearing, this view being taken on line 4—4 of Fig. 1, looking in the direction of the arrows;

Fig. 5 is a detail of the negative electrode guide member;

Figs. 6 and 7 are details of one of the spacers by which the negative electrode guide (Fig. 5) is mounted on the supporting bracket (Fig. 4);

Figs. 8 and 9 are details of one of the negative electrode supporting roll brackets showing its assembly with the journals of its companion roll bracket in dotted lines;

Fig. 10 is a front elevation of the tongs holding and conducting current to the positive electrode;

Fig. 11 is a detail of one of the tongs taken on line 11—11 of Fig. 10;

Fig. 12 is a general view of the driving head for the positive electrode, showing the rotating cage and feeding rolls;

Fig. 13 is a detail view of the frame of the positive electrode driving head, partly in section to show the tensioning means (in dotted lines);

Fig. 14 is a sectional view taken on lines 14—14 of Fig. 12 and 14a—14a of Fig. 13, showing one of the feed rolls swung away (in dotted lines);

Fig. 15 is a detail view of the frame of Fig. 13, partly in section on line 15—15 of Fig. 13, the tension spring being shown in dotted lines tending to rotate the spider 63 clockwise to clamp the electrode;

Fig. 16 is a cross sectional view taken on the line 16—16 of Fig. 1, showing the front elevation of the differential drive mechanism for rotating and feeding the positive electrode;

Fig. 17 is a vertical section of the forward dished gear of the differential and its hub, taken on line 17—17 of Fig. 16;

Fig. 18 is a sectional view of the center gear of the four meshed gears shown in Fig. 16;

Fig. 19 is a partial elevation and sectional view, taken on line 19—19 of Fig. 1, of the step-by-step mechanism for feeding the electrodes, removed from the rear housing of the projector lamp;

Fig. 20 is a part side elevation and part section of the same, taken on line 20—20 of Fig. 19, and also showing the magnetic control for the negative electrode feeding means for which purpose, a portion of the feeding pawl for the positive electrode is broken away.

Fig. 21 is a detail front elevation of the magnetic control for the negative carbon feed, looking in the direction of the arrows 21—21 of Fig. 20;

Fig. 22 is a detail front elevation of the magnetic control for the positive electrode feeding means, the spring casing being shown in section;

Fig. 23 is a wiring diagram of the arc, motor, and magnetic control circuits;

General assembly of lamp

Figure 1:
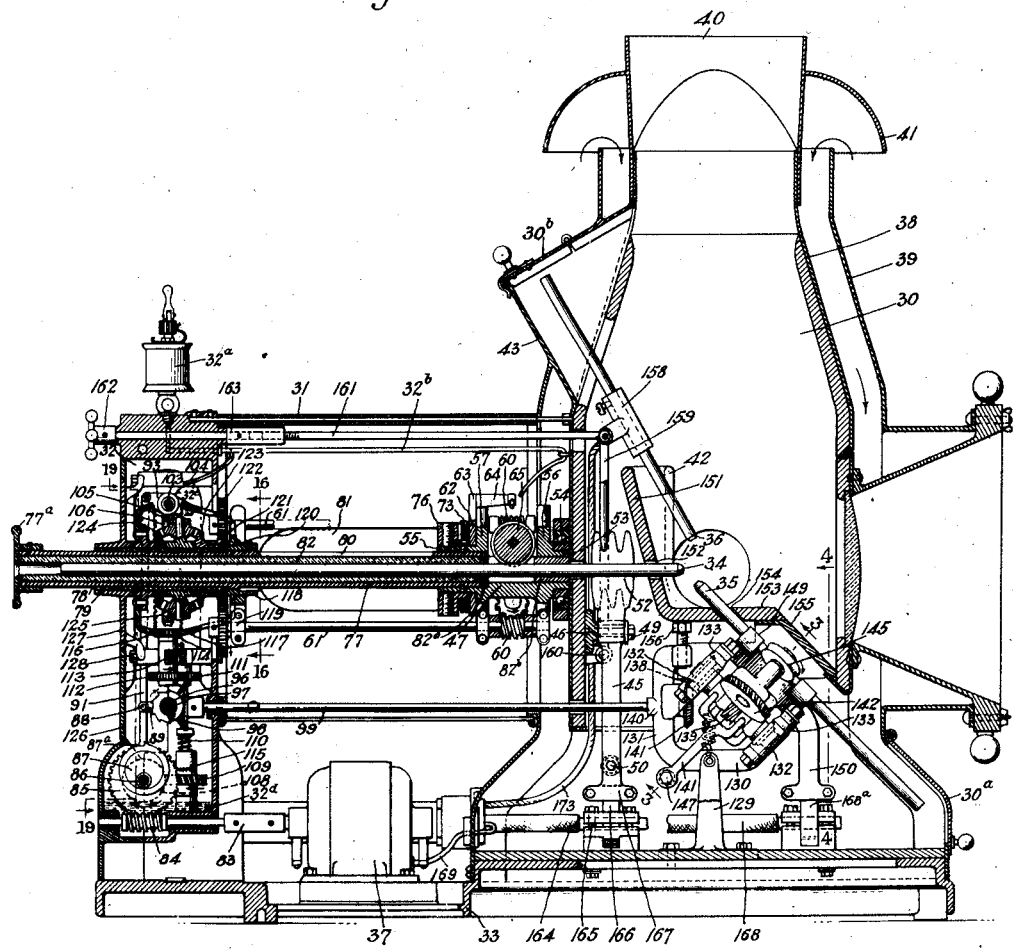
Fig. 1 is a central vertical longitudinal section through the lamp housing and mechanism, certain parts being shown in elevation.

Referring particularly to Fig. 1, it will be seen that my improved projector is enclosed in a casing comprising a lamp house proper 30 of generally upright form, a rearward extension 31 for housing the positive electrode, and a gear box 32 (shown enlarged in Fig. 24) housing the electrode rotating and feeding mechanism, and carrying on its upper portion a sight feed oil cup 32a. The lamp house 30 and the gear box 32 rise from opposite ends of a base 33, and the intermediate housing 31 is supported between these parts. The corners of the casing are rounded, the intermediate housing is elliptical, and to some extent the surfaces are given a stream line effect, avoiding abrupt angles as far as possible. This construction makes an attractive looking lamp and renders it very easy to keep clean, and as a result the pride of the operator prompts him to keep the lamp in good condition, which contributes greatly to the length and quality of service of the lamp.

My projector employs a lamp of the flaming arc type, having a horizontal positive electrode 34, an inclined negative electrode 35 in front of and below the positive carbon, and a dead electrode 36 positioned above the arc and connected to a control circuit. The positive electrode is preferably made in cored form, the tubular walls being hard carbon, and the core of carbon and metallic oxides, the metals employed being chosen with a view to increasing the actinic properties of the light produced.

The appropriate feeding and control mechanism for the positive electrode is carried in the rearward extension of the lamp housing, and similar mechanism for the negative electrode is supported by a bracket in the forward lower end of the lamp. A driving motor 37 is mounted beneath the intermediate housing 31 and is connected by suitable shafts and gearing to rotate and feed the positive electrode 34 and to feed the negative electrode 35, which may be a solid hard carbon electrode of commercial type. Appropriate means for regulation and for hand operation are provided, as described below.

The lamp house 30 is fitted with inner and outer walls 38 and 39, and a top chimney 40 of ample size is provided extending a sufficient distance above the arc to carry away most of the heat produced. Air circulation downward between the inner and outer walls of the lamp house to assist in cooling it is accomplished by having the outer walls shorter than the inner, and the space between them open at the top, although it may be protected by a covering or skirt 41.

At the bottom the inner walls are cut off some distance above the base, the effect being that as hot air rises from around the arc and is drawn off up the chimney 40, cool air is drawn in at the top of the outer wall and downward between the walls into the space below the flame chamber. Air circulation may be augmented by a suction fan on the chimney 40, or by a blower leading into the bottom of the lamp house 30. Neither of these is illustrated, as it is contemplated that the chimney will have an offtake flue discharging into the exhaust duct system with which the projection room is ordinarily provided.

The horizontal intermediate portion 31 of the casing is made in two sections, hinged along the top, and with a side opening 81 to permit observation of the length of the positive carbon. Observation of the flame is made through a darkened window in the side of the chimney. A door 30a at the bottom of the casing, in front, and another 30b at the rear of the upper part of the chimney give access to the negative and dead electrodes, respectively. The lens cell is made in the customary funnel shape and carries a lens which may be formed from fused quartz or other optical material which will pass the actinic rays produced by the arc. This lens cell may be hinged to swing outwardly.

To prevent the arc from being blown about by air currents, and also to protect the lamp mountings and operating and control mechanism from the intense heat, a flame shield 42 of transite board or other refractory and electrically nonconducting material is provided beneath and behind the carbons, being curved from side to side of the flame chamber, as best seen in Figs. 1 and 4. The positive and negative electrodes extend through holes in this shield of just sufficient size to permit free passage.

The inner wall 38 of the lamp house 30 is also lined with transite board or the like. This inner wall is apertured and is extended through the outer wall as at 43 in the upper rear part thereof for the uper end of the dead electrode 36, the heretofore mentioned door 30b being carried by this extension.

Arrangement of support and drive of horizontal electrode

The forward end of the positive electrode 34 is supported between the rear of the flame shield and the rear inner wall of the lamp house 30 by a pair of tongs 44, 45 shown in detail in Figs. 10 and 11. Behind the lamp house this carbon is held by a rotatable driving head comprising feed rolls 65 assembled on the foundation member 47 thereof and bearing against the electrode so that rotation of the feed rolls will advance the electrode at the same time that rotation of the head assembly rotates the electrode. This construction is shown in detail in Fig. 12 and further described below. The support of the rear end of the electrode, and the rotation of the driving head and the feed rolls, are accomplished by means of the apparatus mounted in the gear box 32 and seen in the rear elevation in Fig. 2.

Supporting tongs

The tongs illustrated in Figs. 10 and 11 comprise a pair of arms 48 each pivoted near its upper end upon a stud 49 mounted on an insulated support 46 secured on the rear inner wall of the lamp house. Each arm carries an adjusting screw 50 near the bottom. These screws engage the opposite ends of a horizontal spiral compression spring 51 separating the arms at the bottom and consequently pressing their tops together.

The upper ends of the arms form electrode engaging jaws 52 having outside heat dissipating fins 52a. As shown in Fig. 1, the tong assembly is in the path of cool air rising through the chimney 40. The compression of the spring 51 is so regulated as to cause the jaws 52 to grip the electrode 34 firmly enough to prevent wabbling but lightly enough to allow rotation and axial movement.

Rotatable driving head

The driving head for the rotatable electrode, shown in longitudinal section in Fig. 1 and in detail in Figs. 12, 13, 14 and 15, comprises a cylindrical frame member or drum 47 (best seen in Fig. 13) having a forward journal 53 of reduced diameter, rotating in a bearing 54 upon the rear wall of the chimney, and a rear hub 55 also of reduced diameter. This drum includes a pair of longitudinally spaced flanges 56 and 57 having three pairs of radial ears 58 at equal angular intervals, to which longitudinally aligned bearings 59 are secured as shown in Fig. 12. Worms 60 shown clearly in Figs. 12 and 14, the function of which will be described hereafter, are keyed to shafts 61 journalled in these bearings. A spider 62 (Fig. 15) mounted upon the rear hub 55 adjacent to the flange 57 carries three equally spaced radial arms 63 with forwardly projecting portions 64. The electrode 34 is fed by three rollers 65 of compressed bakelite or like non-conducting material having concave treads and disposed at angles of 120° to one another and on radial lines about the axis of the electrode. As best seen in Figs. 12 and 14, each of these rollers 65 is fast upon the inner end of a shaft the outer end of which carries a worm wheel 66 engaging with and adapted to be driven by the corresponding worm gear 60. Each of the shafts 61 rotates in a bearing sleeve 67 formed upon a two-armed bracket 68 and swivelled upon the shaft 61 at the ends of the worm 60.

A lug 69 on the bracket 68 above the bearing is connected by a pivot 70 and a turn buckle 71 to another pivot 72 upon the end of the adjacent arm 63 of the spider 62. As best shown in Figs. 12 through 15, a flat spiral spring 73 attached at one end to a pin 74 on the rear face of the spider 62 hooks at its other end into a slot 75 cut into the hub of an adjustable spring retaining member 76 mounted on the rear hub 55 of the drum member 47 by means of set screws. Thus, the spider is constantly pulled to urge the arms 63 in a clockwise direction relative to the drum member, as seen in Fig. 15. The clockwise pull is transmitted through the turnbuckles 71 and lugs 69, thus pulling each roll assembly 65—66—68 in a clockwise direction about its bearing 67 and pressing the rolls tightly against the electrode 34. Any of the roll assemblies 65—66—67—68 may be disconnected from its turnbuckle and swung out around the shaft 61 when the roll 65 is to be renewed. The pull on the roll assemblies and the position of the electrode 34 can be adjusted by manipulation of the turnbuckles 71.

A hollow driving shaft 77 is held interiorly of the rear hub 55 of the drum member 47 by any suitable means, such as the set screws shown, and is thus connected to drive the same. This shaft 77 extends rearwardly through the gear box 32. As shown in Fig. 1, the rear end of this hollow shaft is carried in a bearing sleeve 78 held in a tubular boss 79 in the rear wall of the gear box casing 32 and the extreme rear end is provided with a hand wheel 77a for manual rotation. The shaft 77 is cut away to form slots 80, permitting the electrode 34 to be seen, so that replacement may be made when it becomes short, a corresponding inspection opening 81 being left in the side of the casing 31. A glass tube 82 within the spindle, electrically insulates the electrode.

As shown in Figs. 13 and 14, brackets 68 are provided with lugs 68a which lie in recesses 47b in the frame members 47 to allow swinging movement of the roll assemblies, but to prevent any lateral movement thereof which might result from the lateral thrust of the gearing.

As shown in Figs. 1 and 13 the forward ends of the tubular shaft 77 and of the glass tube 82 bear against a washer 82a formed of insulating material, which in turn is held against longitudinal movement by the shoulder 47a formed in the frame member 47. This washer 82a also aids in centering the positive electrode and is assisted in this respect by a similar insulating washer 82b lying within the hub portion 53 of the frame member 47 and held against longitudinal movement by abutment with the rear wall of the lamp housing 30.

The shafts 61 which drive the worms 60 extend rearwardly parallel to the spindle 77 and are also connected to the driving means in the gear box 32.

*Arrangement of driving means for both feed assemblies*

The driving means comprises the motor 37 and a worm shaft 83 directly connected thereto, a worm 84 on said shaft meshing with a worm wheel 85, and two step-by-step pawl and ratchet mechanisms, one of which drives a system of gearing to feed the rotating positive electrode and the other of which actuates a shaft 99 transmitting power to the negative electrode feeding mechanism.

The step-by-step mechanism, which is illustrated in Figs. 1, 2, 19 and 20, comprises a cross shaft 86 supported at its ends in bearings 86a driven from the shaft 83 through the worm wheel 85, and carrying an eccentric 87 which imparts reciprocation through its rod 87a to a cross bar 88 pivoted at its opposite ends on oscillable arms 89 counterweighted as at 90. This bar 88 carries at its respective ends an upright connecting rod 91 and an upstanding elongated pawl 92 forwardly curved near the bottom as at 92a. The connecting rod 91 drives a walking beam 93 mounted on a cross shaft 103 near the top of the gear assembly, from which beam a second elongated pawl 94 depends, adapted to drive a ratchet 95 upon a cross shaft 96, mounted in bearings 96a in the gear casing 32, and carrying a bevel gear 97 which meshes with a larger bevel gear 98 secured to the horizontal negative electrode feed shaft 99, as shown best in Figs. 2 and 20.

Disengaging cams 100 operated by either handle 101 are provided adjacent each of the pawls 92 and 94 to engage and hold them away from the ratchets 95 and 102 and stop the drive without stopping the motor. These cams 100 and handles 101 are clearly shown in Figs. 19 and 20.

Figure 2:
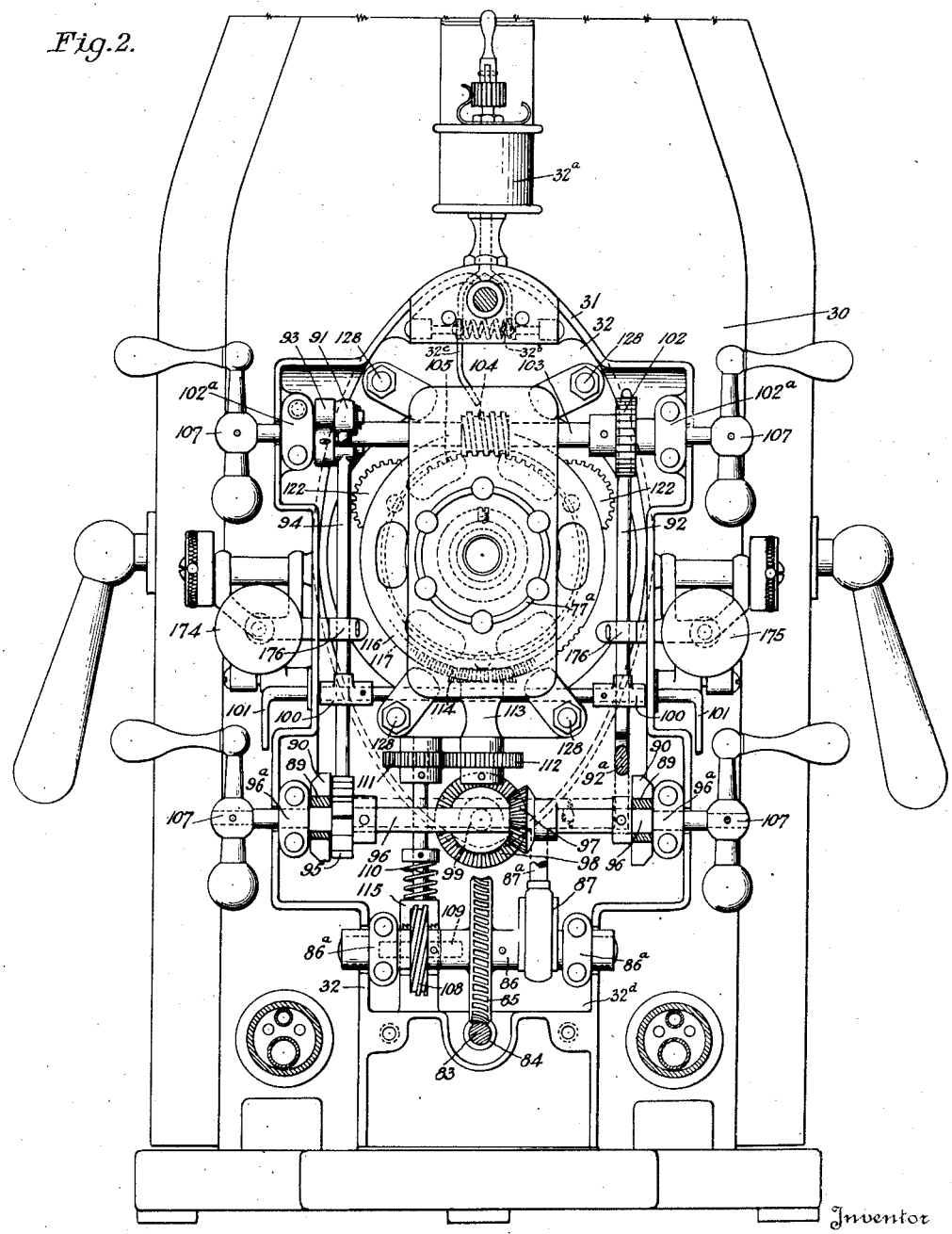
Fig. 2 is a rear end view of the lamp with the casing partially removed showing the principal driving gears of the automatic mechanism for feeding the positive and negative electrodes, certain parts being cut away on line 2—2 of Fig. 20.
Figure 24:
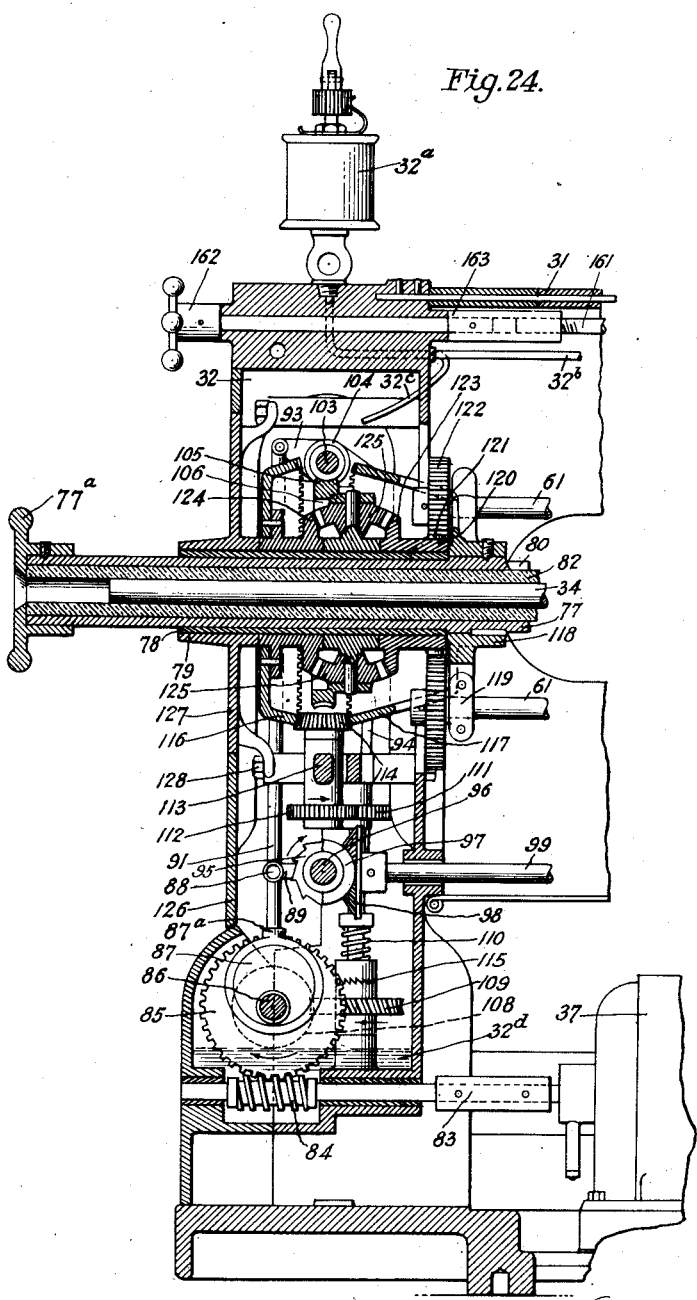
Fig. 24 is an enlarged vertical longitudinal section through the gear box section of the projector, showing the differential electrode feeding and driving mechanism.
Figure 25:
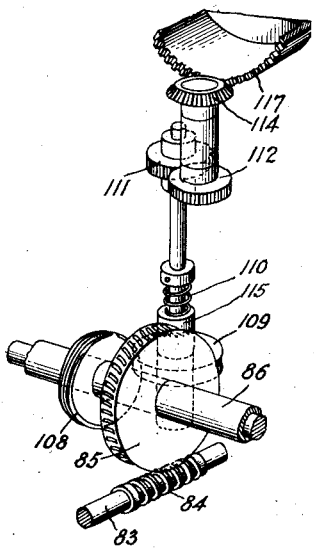
Fig. 25 is a diagrammatic perspective view of the actuating gearing for rotating the positive electrode driving head.

The upstanding pawl 92 drives a ratchet wheel 102 secured to the shaft 103, which extends across the top of the drive assembly and is supported at its ends in suitable bearings 102a in the gear casing 32. This shaft 103 has a central worm 104 engaging a worm wheel 105 on a rotatable gear cage 106 of the planetary differential gear mechanism type, as shown in Figs. 1, 24, and 2. Both ends of said cross shafts 96 and 103 project beyond the sides of the gear box and are fitted with counterweighted crank handles 107 for manual operation, as shown in Fig. 2.

As best shown in Figs. 24, 25, 2 and 1, the motor driven shaft 86 also carries a spiral gear 108, meshing with a spiral gear 109 fast upon a vertical shaft 110 whose upper end carries a spur gear 111, which in turn engages a second spur wheel 112 on the bottom of a vertical shaft mounted centrally of the gear box in a bearing 113 secured inside the gear box above the lower cross shaft 96, and carrying a bevel gear 114 fixed to its upper end. The vertical shaft 110 is provided with a spring-pressed one-way crown ratchet clutch 115, transmitting rotation in one direction and permitting manual rotation of the positive electrode drive assembly by means of the hand wheel 77a at the extreme rear of shaft 77. The bevel gear 114 engages crown teeth upon the opposing face of two independently rotatable cup-shaped members 116 and 117 which face one another upon the bearing sleeve 78.

Referring to Figs. 16, 17 and 18 the forward cup member 117, which is the deeper of the two, has a hub 118 keyed or otherwise made fast upon the hollow shaft 77, which hub in turn has three radial arms, each of which supports the rear end of one of the three parallel shafts 61, mentioned above, suitable bearings 119 being provided on the arms for this purpose. Thus the entire feed assembly shown in Fig. 12, together with the forward cup-shaped element 117, the hollow shaft 77 with its glass tube 82, the positive electrode 34, and the three shafts 61, are rotatable as a unitary system about the axis of the electrode, and revolve in unison directly in proportion to the speed of the bevel gear 114.

The positive electrode is fed forward while rotating as follows:

Referring particularly to Figs. 24 and 1, a sleeve 120 freely rotatable upon the bearing sleeve 78 has a ring of spur teeth 121 at its forward end, meshing with the spur gears 122 upon the rear ends of the shafts 61, so that when the speed of the sleeve 120 varies from that of the deep cup-shaped element 117, said shafts 61 will rotate, thus driving the rolls 65, and feeding or retracting the positive electrode according to the direction of the relative rotation. The rear end of the sleeve 120 is provided with bevel gear teeth 123, constituting the front crown gear of the differential gear mechanism mentioned above, which mechanism is controlled by the rotation of the cage 106, and includes also a rear crown gear 124, fast with the rear cup-shaped member 116 and rotatable therewith relatively to the hollow shaft 77. Planetary gears 125, carried on radial studs on the cage 106, are meshed with the gears 123 and 124. The cage 106 is mounted so as to be freely rotatable upon the bearing sleeve 78, but is normally held stationary by the worm 104 on the upper cross shaft 103, so as to be rotatable only by said worm.

Thus, as the two cup-shaped members 116 and 117 are driven in opposite directions at the same speed by the bevel pinion 114, so long as the planetary differential gear pinions 125 are held axially stationary, they will reverse the motion of the rear cup element 116, and so drive the sleeve 120 at the same speed and in the same direction as the front cup element 117, keeping the gears 121 and 122 relatively stationary with respect to each other, so that the shafts 61 do not rotate and the electrode 34 does not feed.

In the normal operation of the lamp, the worm 104 is slowly turned by the action of the pawl 92 on the ratchet 102, or it may be turned at times by either handle 107 on shaft 103, thereby turning the gear cage 106 and introducing a relative difference in speed between the gears 123 and 124, and a corresponding difference in speed between the sleeve 120, carrying gear 121, and the hub 118 which carries the gear 117 and is fixed upon the hollow shaft 77, and consequently the gears 122 are rotated to actuate the positive electrode feed rolls 65. The motor 37 can only actuate the mechanism to give forward feed to the electrodes, but the electrodes can be retracted by throwing off the pawls by the handle 101 and cams 100, and then turning either of the handles 107 on shaft 103 to manually move the positive electrode, or by turning either of the handles 107 on shaft 96 to manually move the negative electrode, as hereinafter described.

Doors 126 in the rear of the casing or gear box 32, (see Figs. 1 and 24, not shown in Fig. 2) permit access to the rotating and feeding mechanism for the electrodes. Also the rear plate 127, carrying the tubular boss 79 through which the bearing sleeve 78 passes, which is secured to the gear box frame by four cap screws 128, may be removed to permit inspection and removal of the driving gears.

*Details of support and feed for negative electrode*

The negative electrode 35 and holder therefor are supported by a double pedestal 129, bolted to the base 33 but insulated therefrom, in the space beneath the arc chamber (see Fig. 1) and are mounted on frame members 130, 131, extending upwardly from the pedestal, and provided with spaced journal supports 132 for the journal 134 upon which the yoke members which support the electrode feed rolls are pivotally mounted (see Figs. 3 to 9 inclusive) by means of spaced bearings 135, 136. The journal supports 131 and 132 also carry the negative electrode guide member shown in detail in Fig. 5, and the flame shield 42 heretofore described. The relative positions of the negative electrode feed roll carrying brackets is shown in detail in Figs. 8 and 9. The bearings 135, 136, 135a, 136a of these roll brackets are offset so as to straddle the central plane of the feed roll assembly, and provide a space between them for the gearing that operates the feed rolls, each journal 134 being just sufficiently long to extend through the abutting pairs of bracket bearing members 135, 136a or 136, 135a. The shaft 137 passing through and journalled within the double bearings 134 has keyed to its upper end a bevel gear 138, and carries a worm gear 139 fixed to its central portion which lies between the ends of the journal members 134 and spaced bearings 135 and 135a.

The upper arm 131 of the supporting member 129 also carries a bearing 140 supporting the forward end of the negative electrode drive shaft 99, which is keyed to a bevel gear 141 meshing with the bevel gear 138. Thus, rotation of the shaft 99 will, by means of gears 140, 138 and shaft 137, cause rotation of the worm gear 139.

This worm gear 139 meshes with two worm wheels 142 which are fastened on shafts 143 journalled in bearings 144 carried by the negative electrode roll brackets, as clearly shown in Fig. 3. The other ends of these shafts 143 carry the negative electrode feed rolls 145 which are formed of insulating material. The negative electrode feed roll carrying brackets include depending arms 146, the lower ends of which are spaced apart and carrying adjusting screws 147 between which a coil spring or other resilient member 148 is arranged for pressing them apart so as to cause the feed rolls 145 to be urged toward each other.

The negative electrode guide member 149 is supported on the spaced members 132, but is insulated therefrom by washers 133 of non-conducting material. This guide member 149 is arranged between and slightly below the feed rolls 145, which are so arranged in the assembly that when urged toward each other as set forth above they bear downwardly against the electrode 35 and hold it firmly seated against the guide member 149.

The negative electrode 35 may be composed of hard carbon, and is connected into the circuit through the guide member 149, which is conveniently provided with a depending bracket member 150 for this purpose, as shown in Figs. 1 and 5.

Details of the flame and grit shield

The flame shield 42, shown in section in Fig. 1, and in front elevation in Fig. 4, comprises an upright rearwardly inclined curved portion 151 having a hole 152 through which the tip of the positive electrode 34 extends; a horizontal portion 153 with an inclined aperture 154 for the tip of the negative electrode 35, and a downwardly extending skirt 155 which meets and is supported on the transite lining of the lamp house below the lens mounting.

The rear of this shield rests upon a vertically adjustable screw 156 carried by the top of the bracket 131. The shield is held down by tension springs 157, Fig. 4, from the front edge to the negative electrode support 129. The flame shield may readily be removed through the front opening for the lens frame for cleaning and inspecting.

Mounting of control electrode

In the present embodiment of the invention, a carbon rod is used for the control circuit or "dead" electrode. This electrode will require adjustment only at rare intervals, and therefore only manual adjusting means are provided. As shown in Fig. 1, the "dead" electrode 36 is held in a sleeve 158 by a set screw, and the sleeve is rather tightly pivoted to the upper ends of a pair of links 159, which are pivotally supported at their lower ends upon a pair of brackets 160. A horizontal rod 161, which projects through the rear of the lamp housing and is relatively loosely pivoted to the sleeve 158 at its forward end, is movable forwards and backwards to adjust the position of the "dead" electrode. The movement of the rod 161 is controlled by a handwheel 162, mounted on a shaft on the rear of the gear casing, through a screw connection 163.

Electrical connections and power and control circuits

The positive and negative electrical circuit connections and control circuits are indicated diagrammatically in Fig. 23. These circuit connections are made in any suitable manner.

As shown in Figs. 1 and 10, the end of the positive lead-in conductor 164, is held in a conducting clamp 165, bolted to the base 33 but insulated therefrom. Laminated ribbon conductors 166 lead therefrom to the clamps 167 at the bottom of the tong legs 48. The negative conductor 168 is likewise connected by a laminated ribbon conductor 168a to the depending bracket 150 of the negative carbon guide 149, by a similar screw clamp.

The main circuit 164—168 is completed by the arc across the gap between the positive and negative electrodes 34 and 35, as usual. The motor 17 is operated continuously on a shunt circuit 169—170 off the main circuit conductors bridging the arc gap, and the feeding of the positive and negative electrodes is controlled by separate shunt circuits 171—172 and 171—173 into which current flows from the arc flame with intensity varying with the position of the flame.

The control circuit 171—172 is parallel with the arc, and passes through a magnet 174, controlling the feeding of the negative electrode and a resistance unit 182 arranged in series, so that the current through this circuit will be inversely proportional to the resistance of the arc. The circuit 171—173 passes through magnet 175, controlling the feeding of the positive electrode, and is completed and controlled by the position and conductivity of the flame between the negative electrode 35 and the third electrode 36. In this manner the magnets 174 and 175 are selectively energized to actuate the automatic feed to prevent flame variation.

Operation of control devices

The armature of each of the control magnets 174 and 175 includes a finger 176 adapted to move its respective pawl into or out of engagement with its ratchet so that when an abnormal condition of the flame or arc causes sufficient current to flow through either control circuit, the electrodes are fed until the flame again becomes normal.

The construction of these pawl moving fingers 176 is illustrated in Figs. 21 and 22. As there shown, the fingers 176 are carried by an armature 177 pivotally mounted above the magnets on a fixed axle 177a. Affixed to a pin 178 in armature 177 is one end of a flat coil spring 179 the other end of which is fastened into a spring casing 180, adjustably mounted on the axle 177a and clamped thereto by a set screw 181 in such position as to cause the spring to pull the respective armatures away from the magnets 175 and 174. A sufficient flow of current through magnet 175 will attract its armature 177 against the tension of its spring 179, and its finger 176 will move pawl 92 into engagement with ratchet 102 and cause feeding of the positive electrode; and similarly a sufficient flow of current through magnet 174 will in the same way actuate its finger 176 to move pawl 94 into engagement with ratchet 95 and cause feeding of the negative electrode. The small cams 100 merely lock the pawls 92 and 94 out of engagement with their respective ratchets and thus render the magnetic control ineffective when manual adjustment is being made.

Lubrication

The meshed gears and bearings of the rotating driving head are lubricated by oil conveyed from the sight feed oil cup 32a by means of channel 32b arranged so that the oil will drip onto gears 60, and 66 and work its way to the other bearing surfaces of the head. The differential is similarly lubricated by means of oil line 32c, and the lower portion of the gear housing 32 forms an oil sump 32d for the lubrication of the driving gears 85, 108, 109 and the eccentric 87.

*General summary*

Thus it is seen that this invention provides (1) means for rotating the positive electrode continuously while providing an intermittent automatic feeding of both electrodes, and means whereby hand adjustment of the electrodes may be effected when such adjustment is desirable; (2) a flame shield to prevent blowing about of the flame and to prevent the fouling of any part of the mechanism by residues from the arc; (3) at least a partial circulation of cooling air through the device in the most effective manner by thermosyphonic circulation; (4) such a formation and symmetrical arrangement of parts as to reduce vibration from the driving mechanism to a minimum and give the entire device a neat and pleasing appearance tending to give the operator pride in his machine which will cause him to keep it in good condition; (5) a complete electrical insulation of the greater portion of the mechanism from those portions which must of necessity carry the current for the arc; (6) a satisfactory heat insulation of the driving rolls; (7) a complete heat insulation of the driving gears; and (8) a ready accessibility of all parts for inspection, adjustment, or repair.

My invention is not limited to the preferred embodiment herein described in detail, but includes all equivalent devices as set forth in the following claims.

I claim:

1. In an arc lamp, in combination with a base, a lamp housing at one end of the base, a gear box at the other end of the base, and an intermediate housing arranged between the lamp housing and gear box; said lamp housing having an inner wall provided with an upstanding chimney portion, and having an outer wall spaced from said inner wall and of less height than said chimney portion, said outer wall extending to said base and said inner wall being open to the interior of said lamp housing at the base whereby circulation of air downwardly between said walls and upwardly through said chimney portion will be induced by the heat of the arc; means in said lamp housing to restrict the major part of the heat of the arc to the immediate vicinity of the arc and the chimney portion of the lamp housing; an upwardly inclined electrode support provided with electrode feeding means in the lower portion of said lamp housing; a rotating horizontal electrode drive-head provided with electrode feeding means in said intermediate housing; gearing in said gear box connected to rotate said horizontal electrode drive-head; gearing in said gear box actuable to selectively operate said feeding devices of said horizontal electrode driving head and said inclined electrode support; automatic means for actuating said last named gearing to selectively operate the horizontal and inclined electrode feeding devices; and means included in the arc circuit for supporting the rotated electrode and making the electrical connection thereto, said last named means being located in the path of the up-flowing air current in the interior of the lamp housing at a point outside of the area to which the major portion of the heat is restricted, whereby all working parts of the device are protected from the heat of the arc.

2. In an arc lamp, in combination with a motor (37), a rotatable electrode holding and feeding head (47 etc.), and a driving and feeding mechanism including, a head driving shaft (77) connected to said head, a driving gear (117) rigidly fixed to said shaft and connected to be driven by said motor, means carried by said head for holding said electrode and actuable to advance the same (65), and actuating connections through which said last named means may be actuated (122—61—60—66), said elements of the driving and feeding mechanism rotating as a unit on rotation of said driving gear (117) by said motor (37), and said driving and feeding mechanism also including a differential having a driving gear (124) and a driven gear (123) interconnected by gearing carried by a differential cage (106), said differential driving gear (124) being connected to be driven by said motor (37), and said differential driven gear (123) being connected to drive said actuating connections (122—61—60—66), said gear carrying differential cage (106) being held against free rotation by gearing (104—105) actuable to positively rotate said cage to change the speed of rotation of said differential driven gear (123) relative to said differential driving gear (124); said elements of the driving and feeding mechanism being so proportioned that said electrode holding means (65) is actuated to advance the electrode only on positive rotation of said differential cage (106).

3. In an arc lamp, in combination with a motor (37), a rotatable electrode holding and feeding head (47 etc.), and a driving and feeding mechanism including, a head driving shaft (77) connected to said head, a driving gear (117) rigidly fixed to said shaft and connected to be driven by said motor, means carried by said head for holding said electrode and actuable to advance the same (65), and actuating connections through which said last named means may be actuated (122—61—60—66), said elements of the driving and feeding mechanism rotating as a unit on rotation of said driving gear (117) by said motor (37), and said driving and feeding mechanism also including a differential having a driving gear (124) and a driven gear (123) interconnected by gearing carried by a differential cage (106), said differential driving gear (124) being connected to be driven by said motor (37), and said differential driven gear (123) being connected to drive said actuating connections (122—61—60—66), said gear carrying differential cage (106) being held against free rotation by gearing (104—105) actuable to positively rotate said cage to change the speed of rotation of said differential driven gear (123) relative to said differential driving gear (124); said elements of the driving and feeding mechanism being so proportioned that said electrode holding means (65) is actuated to advance the electrode only on positive rotation of said differential cage (106), and means operable to actuate said gearing (104—105) to positively rotate said cage (106); said last named means being automatically controlled by the condition of the arc.

4. In an arc lamp, electrode carrying, driving and feeding means comprising, in combination, a rotatable electrode driving and feeding head provided with combined means to hold the electrode for rotation with said head and to axially feed the same; head driving means connected to said driving head for rotating the same; feed driving means comprising a differential gear train having a driving gear and a driven gear interconnected by gearing carried by a differential cage, and the driven gear of which normally rotates at such a speed relative to that of the head driving means that no feeding of the electrode will occur; said differential cage being automatically controlled by the condition of the arc for altering the speed of said driven gear relative to the speed of said head driving means to cause feeding of the electrode.

5. In an arc lamp, electrode carrying, driving and feeding means comprising, in combination, a rotatable electrode driving and feeding head provided with combined means to hold the electrode for rotation with said head and to axially feed the same; head driving means connected to said driving head for rotating the same; feed driving means comprising a differential gear train having a driving gear and a driven gear interconnected by gearing carried by a differential cage, and the driven gear of which normally rotates at such a speed relative to that of the head driving means that no feeding of the electrode will occur; said differential cage being for altering the speed of said driven gear relative to the speed of said head driving means to cause feeding of the electrode.

6. In an arc lamp, electrode carrying, driving and feeding means comprising, in combination, a rotatable electrode driving and feeding head provided with combined means to hold the electrode for rotation with said head and to axially feed the same; head driving means connected to said driving head for rotating the same, feed driving means, independent of but related to said head driving means, connected to the feeding means of said head, said head driving means and feed driving means being normally driven at such relative speeds that no feeding of the electrode will occur, means for driving said head and feed driving means including a differential gear cage and gearing, and means for controllably moving said differential gear cage for positively changing the relation between the speeds of the head and feed driving means.

7. In an arc lamp, electrode carrying, driving and feeding means comprising, in combination, a rotatable electrode driving and feeding head provided with combined means to hold the electrode for rotation with said head and to axially feed the same; head driving means connected to said driving head for rotating the same and feed driving means connected to the feeding means of said head, said head driving means and feed driving means being normally operated at such relative speeds that no feeding of the electrode will occur, means for driving said head and feed driving means including a differential gear cage and gearing, and means for controllably moving said differential gear cage for positively changing the relation between the speeds of the head and feed driving means.

8. A driving head adapted to hold and selectively advance and rotate a lamp electrode comprising, in combination, a rotatable drum having an axial opening therethrough for the passage of said electrode, a tubular journal at one end of said drum in prolongation of the edges of said axial opening, means centering said electrode in said axial opening and insulating it from said drum, a plurality of armed brackets each pivotally mounted at one end within the periphery of said drum, an insulating electrode roller journalled in each of said brackets and having its circumference in a plane substantially radial to said drum and adapted to engage said electrode, a spider mounted in juxtaposition to said drum and arranged for limited rotation about the axis thereof, means on said spider adapted to engage with and move the free ends of said brackets to regulate the contact of said rollers with said electrode, driving means operatively connected to each of said rollers, and independent but parti-synchronously related driving means operatively connected to said drum, whereby said electrode may be rotated or moved lengthwise.

9. A driving head adapted to hold and selectively move a lamp electrode, comprising, in combination, a rotatable drum having an axial opening therethrough for the passage of said electrode, a central hollow boss on one head of said drum in prolongation of the edges of said axial opening and forming a journal for said drum, a plurality of armed brackets each pivoted at one end within said drum, an electrode holding and feeding roller journalled in each of said brackets and having its circumference in a plane substantially radial to said drum and adapted to engage said electrode, a spider mounted in juxtaposition to said drum and arranged for limited rotation about the axis thereof, means on said spider operatively engageable with the free ends of said brackets to regulate the contact of said rollers with said electrode, driving means operatively connected to each of said rollers, and independent but partisynchronously related driving means operatively connected to said drum, whereby said electrode may be rotated or moved lengthwise.

10. In an electrode feeding mechanism, an electrode feeding head having tensioned rolls and including a frame member; a plurality of roll-brackets mounted on pivots substantially parallel to the axis of the electrode carried by said frame member and arranged at substantially right angles to said frame member; feed-roll carrying shafts journalled in said brackets at such an angle that the peripheries of the feed-rolls when in contact with the electrode lie in planes substantially radial to the axis of said electrode; and tensioning means connected to said brackets and tending to rotate them about their pivots to hold said feed-rolls in tight engagement with said electrode.

11. In an electrode supporting and feeding mechanism, a stationary electrode support, and a plurality of tensioned insulating rolls arranged in converging relation laterally and obliquely with respect to the electrode to hold it firmly seated on said support, and to simultaneously grip it between them for positive feeding.

12. Automatic means for feeding the electrodes of an arc lamp including mechanical means for supporting and feeding the respective electrodes, and means actuating portions of said mechanical means to cause feeding of the electrodes including a first magnet and a resistance arranged in parallel with the arc and actuating one portion of said mechanical means, and a second magnet connected from one side of the arc to a third electrode positioned adjacent the arc and actuating another portion of said mechanical means; said second magnet being actuated by displacement of the arc and said first magnet being independently actuated by increased resistance of the arc whereby to selectively actuate different portions of the feed mechanisms.

13. In an arc lamp of the rotating electrode type, a lamp housing and means for supplying a current of cool air to the lamp housing, an electrode rotating and feeding device arranged entirely outside the lamp housing in the path of said current of cool air passing to said lamp housing, and means for entirely shielding said electrode rotating and feeding device from the direct heat of the arc.

14. In an arc lamp of the rotating electrode type, an electrode rotating and feeding device entirely electrically insulated from the electrode carried thereby and including a glass-lined tubular shaft forming the electrode carrying means and formed with openings to admit of inspection of the carbon length during rotation.

15. A projecting lamp housing comprising in combination, a flame hood having inner and outer walls, said inner wall projecting above said outer wall and constituting a chimney, a skirt upon said projection extending beyond said outer wall, and air circulating passages under said inner wall whereby air is drawn in under said skirt, drawn downward between said inner and outer walls, and moved upward within said inner wall by the heat of the flame in said housing.

16. In an arc lamp, in combination with a plurality of electrodes and supporting means for the same, a refractory heat insulating flame and grit shield between the operating ends of said electrodes and said supporting means.

17. In a projecting lamp, in combination, an electrode holding and driving head comprising a rotatable frame member, a plurality of arms therein pivoted on axes substantially parallel to the axis of rotation of the frame, a shaft carried by each of said arms, a roller and a worm gear on each of said schafts, worms meshing with said gears and adapted to be driven, means arranged for limited movement about the axis of and relative to said frame connected to draw said rollers toward the axis of rotation of said frame, and means impelling said last named means in the direction to hold the rollers against the electrode for rotating the electrode with the frame and holding it to be moved by rotation of said rollers.

18. In an arc lamp of the rotating electrode type, a lamp housing embodying an arc chamber, an electrode extending into said arc chamber, an electrode rotating and feeding device arranged entirely outside the lamp housing, and insulating means embodied in said lamp interposed between the arc chamber and the electrode rotating and feeding device to insulate the latter from the direct heat of the arc.

19. In an arc lamp of the rotating electrode type, an electrode rotating and feeding device entirely electrically insulated from the electrode carried thereby and including a tubular shaft formed with side openings and provided with insulating means therein insulating the electrode therefrom without interfering with a view of the electrode through the openings, thereby to admit of inspection of the carbon length while the electrode is rotating.

20. A projecting lamp comprising an arc lamp housing proper, an intermediate housing containing electrode rotating and feeding means, means insulating said itermediate housing from the direct heat of the arc, and a third housing containing the control mechanism for said electrode rotating and feeding means, said housings being carried on a common base, said housing walls being utilized as supports for parts of the mechanism enclosed thereby, and said mechanisms and housings being disposed symmetrically about a longitudinal vertical plane whereby tendency of the parts to vibrate is minimized.

21. A projecting lamp provided with a double-walled flame hood of which the space between the walls communicates at its upper end with the outside air and at its lower end with the space inside the hood, and an arc lamp in said latter space, whereby the heat of the arc will cause air to circulate downwardly between the double walls.

In testimony whereof, I have signed my name to this specifiction.

RUDOLPH A. GLASER.